United States Patent [19]

Momozaki et al.

[11] Patent Number: 5,346,626
[45] Date of Patent: Sep. 13, 1994

[54] METHOD OF REMOVING SCALE

[75] Inventors: Katsuhiko Momozaki; Masako Kusunoki; Fumio Kawamura, all of Tokyo; Hisao Ono, Yokkaichi; Katsumi Itoh, Kameyama; Yoshihiro Shimizu, Aichi; Yuuichi Ono, Tokyo, all of Japan

[73] Assignees: Kurita Water Industries Ltd.; Japan Synthetic Rubber Co., Ltd., both of Tokyo, Japan

[21] Appl. No.: 83,236

[22] Filed: Jun. 29, 1993

[30] Foreign Application Priority Data

Jun. 29, 1992 [JP] Japan ................. 4-194924

[51] Int. Cl.$^5$ ............................... C02F 5/10
[52] U.S. Cl. ................... 210/701; 134/3; 134/22.19; 210/743; 210/698; 252/180
[58] Field of Search .............. 134/2, 3, 22.19; 210/698–701, 743; 252/180

[56] References Cited

U.S. PATENT DOCUMENTS

| | | | |
|---|---|---|---|
| 3,682,224 | 8/1972 | Bleyle | 252/180 |
| 4,048,066 | 9/1977 | Cuisia et al. | 252/180 |
| 4,253,968 | 3/1981 | Eastman | 210/698 |
| 4,469,615 | 9/1984 | Tsuruoka et al. | 210/698 |
| 4,640,793 | 2/1987 | Persinski et al. | 210/701 |
| 4,913,823 | 4/1990 | Lipinski et al. | 210/698 |
| 5,182,343 | 1/1993 | Ono et al. | 210/701 |
| 5,183,573 | 2/1993 | Kreh et al. | 210/697 |

FOREIGN PATENT DOCUMENTS 2054548  6/1980  United Kingdom .

OTHER PUBLICATIONS

Patent Abstracts of Japan, JP 4,028,708, Jan. 1992.

*Primary Examiner*—Peter A. Hruskoci
*Attorney, Agent, or Firm*—Millen, White, Zelano, & Branigan

[57] ABSTRACT

A method of removing scale in a cooling water system in which scale is formed comprises adding 0.01 weight % or more based on the total amount of water contained in the cooling water system of a copolymer containing vinyl monomer units having a carboxyl group or salt thereof and vinyl monomer units having a sulfo group or salt thereof in amounts to make the mol ratio of the carboxyl group to the sulfo group in the range of 30:70 to 95:5 and having weight average molecular weight calibrated with polystyrene in the range of 1,000 to 100,000 to the cooling water system while operating the cooling water system and the cleaved or dissolved scale is discharged out of the cooling water system by blowing. The scale removing agent for a cooling water system has excellent ability to remove scale, does not require much man power nor causes loss of productivity because the scale can be cleaned and removed without stopping the circulation of the cooling water while the ordinary operation of the system is maintained and has no possibility of such danger to operator as found in conventional acid cleaning processes because the agent is used in less acidic condition. Furthermore, the polymer itself has the characteristic that is not easily formed. The finishing point of the scale removal can be found easily by measuring the pH value on the spot of the operation without stopping the operation of the cooling water system.

9 Claims, No Drawings

METHOD OF REMOVING SCALE

BACKGROUND OF THE INVENTION

1. Field of the Invention

The present invention is related to a novel method of removing scale in a cooling water system. More particularly, the present invention is related to a method of efficiently removing scale by using a scale removing agent for a cooling water system comprising isoprene sulfonic acid copolymer which has excellent ability to remove scale and does not easily form gel. The method also allows removal of scale without stopping operation of cooling water system while the ordinary operation of the cooling water system is maintained.

2. Description of the Prior Art

On heat transfer surfaces of boilers or cooling water systems, various kinds of hazard on the operation, such as decrease of heat efficiency, local corrosion and the like, occur often because of formation of scale, accumulation of sludge and the like other causes. It is known that the scale and the sludge are formed by concentration of impurities in water, such as calcium, magnesium, iron, silica and the like, which under conditions of high temperature lead to a decrease of solubilities of calcium carbonate, hydroxy apatite, iron oxides, magnesium silicate and the like and and precipitation of these compounds on the heat transfer surfaces of water side.

Furthermore, refrigerators have recently advanced recently in their packaging and higher performance and, because of this advancement, the rate of vaporization per unit heat transfer surface is highly enhanced in comparison with that of refrigerators of former types. By the increase of heat load on the heat transfer surface as described above, impurities in water are concentrated to a higher degree. Thus, scale is easier to be formed than before and slight formation of scale leads to increase of consumed electric power or steam and decrease of cooling efficiency, making the scale hazard a more important problem.

As the method of removing scale such as described above, a method of cleaning with an inorganic acid, such as hydrochloric acid, and a method of using a water soluble carboxylic acid copolymer are known. The method of cleaning with an acid has drawbacks that the operation of the cooling water system must be stopped for a while because a cleaning apparatus is added to the system and the cleaning operation is conducted while operation of the system is stopped, that the cleaning operation takes a long time and that there are other problems like corrosion of water systems and danger during handling.

On the other hand, in the method of using a water soluble carboxylic acid copolymer, although stopping of the operation of cooling water system is not required and the problem of corrosion of instruments and danger during handling are reduced, the content of monomer units having a carboxyl group, such as acrylic acid, maleic acid and the like, in the copolymer has to be increased for enhancing the abilities to dissolve scale like calcium carbonate and to prevent precipitation of scale. However, there arises a problem that a higher content of the monomer units having a carboxyl group in the copolymer results in higher tendency of the copolymer to form gel.

As the scale removing agent comprising a carboxylic acid copolymer, a scale removing agent comprising a copolymer of itaconic acid and other unsaturated carboxylic acid or unsaturated monomers other than the unsaturated carboxylic acid was proposed (Japanese Patent Publication 1986-47195). This agent has drawbacks that it forms gel easily and that operation cost is high in comparison with the ability to remove scale.

It is described in Japanese Patent Application Laid Open No. 1990-9496 that a polymer of sulfonated product of a conjugated diene is used as a cleaning agent for pipes.

A method of removing scale without stopping operation of cooling water system while the ordinary operation is maintained (On Stream Scale Removal) has been desired. As the method of cleaning verdigris without stopping operation of cooling water system, a method of using verdigris removing agent comprising hydrazine has heretofore been known (Japanese Patent Publication 1988-45474). However, scale of calcium compounds cannot be removed by this method. Because the inside of a heat exchanger cannot be observed directly in the method of removing scale in a cooling water system, general practice is that a cleaning agent is added after the operation of the cooling water system is stopped and, after the cleaning for a specified time, the cleaning water is brought into a laboratory to measure concentration of calcium by using atomic absorption spectrum method or the like. However, the evaluation of the effect of the cleaning by this method takes a lot of time and occasionally effects adversely on stable operation of a plant or an air conditioner. Thus, development of a method of evaluating the effect of cleaning on the spot of the operation in a short time has been desired.

SUMMARY OF THE INVENTION

The present invention has an object of solving the problems of the conventional scale removing agents and providing a method of removing scale using a polymeric scale removing agent which can remove scale without stopping operation of cooling water system while the ordinary operation of the cooling water system is maintained, does not have the problem of corrosion of water systems or danger during handling and does not form gel easily. The present invention has another object of providing a method of removing scale in which the effect of cleaning is rapidly evaluated.

As the result of intensive study to develop a method of removing scale using a polymer having the favorable properties described above, it was discovered that the object can be achieved by a scale removing agent comprising as the effective component thereof an isoprene sulfonic acid copolymer containing repeating units derived from (meth)acrylic acid or a salt thereof and repeating units derived from isoprene sulfonic acid or a salt thereof in amounts of a specified ratio and having a specific range of molecular weight. Also, a phenomenon was discovered that, while circulating water in a cooling water system is generally kept in a neutral or a low alkaline condition, the pH value is temporarily decreased by addition of an acidic dissolving agent containing the copolymer described above before dissolution of calcium carbonate and the pH value is increased again by increase of dissolved calcium carbonate with the progress of the cleaning operation and it was discovered that the end point of the cleaning operation can be found by measuring the pH value. The present invention was completed on the basis of the discovery.

Thus, the present invention comprises the following individual inventions:

1. A method of removing scale which comprises adding 0.0 1 weight % or more based on the total amount of water contained in the cooling water system of a copolymer containing vinyl monomer units having a carboxyl group or salt thereof and vinyl monomer units having a sulfo group or salt thereof in amounts to make the mol ratio of the carboxyl group to the sulfo group in the range of 30:70 to 95:5 and having weight average molecular weight calibrated with polystyrene sulfonic acid sodium salt in the range of 1,000 to 100,000 to a cooling water system in which scale is formed without stopping the operation to remove or dissolve the scale, the scale being discharged out of the cooling water system by blowing.

2. A method of removing scale described in 1, wherein the copolymer comprises as the effective component thereof isoprene sulfonic acid copolymer containing (A) repeating units expressed by the formula (1):

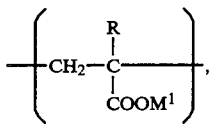
(1)

wherein R is a hydrogen atom or methyl group and $M^1$ is a hydrogen atom or a monovalent cation, and (B) repeating units expressed by the formula ( 2 ):

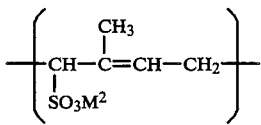
(2)

or (C) repeating units expressed by the formula (3):

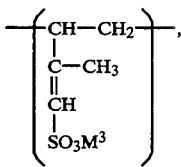
(3)

wherein $M^2$ and $M^3$ are a hydrogen atom or a monovalent cation, respectively.

3. A method of removing scale described in 1 or 2, wherein a scale removing agent containing the copolymer is added to the circulating water system in which scale is formed, then pH of the circulated water is measured and the cleaning operation is finished when the pH reaches a specific value designated in advance.

4. A method of removing scale described in 3, wherein the specific value of pH is 5 or higher.

Other and further objects, features and advantages of the invention will appear more fully from the following description.

DETAILED DESCRIPTION OF THE INVENTION

The scale removing agent of the present invention comprises a copolymer of a vinyl monomer having a carboxyl group or a salt thereof and a vinyl monomer having a sulfo group or a salt thereof.

Examples of the vinyl monomer having carboxyl group or a salt thereof are acrylic acid, methacrylic acid, itaconic acid, maleic acid and salts thereof. The preferable examples among them are acrylic acid, methacrylic acid and salts thereof.

Examples of the vinyl monomer having a sulfo group or a salt thereof are sulfo derivatives of conjugated dienes, such as butadiene, isoprene and the like, styrenesulfonic acid, 2-acrylamide-propanesulfonic acid, vinylsulfonic acid, 2-sulfoethyl (meth)acrylate, 3-sulfopropyl (meth)acrylate, 2-sulfopropyl (meth)acrylate, 1-sulfopropane (meth)acrylate, 4-sulfobutyl (meth)acrylate and alkali metal salts, such as sodium salts, potassium salts and the like, of these compounds, alkaline earth metal salts, such as magnesium salts, calcium salts and the like, of these compounds and ammonium salts and organic amine salts of these compounds.

Among these compounds, sulfo derivatives of isoprene are preferable.

The particularly preferable copolymer is a copolymer comprising as the effective component thereof isoprene sulfonic acid copolymer containing (A) repeating units expressed by the formula (1):

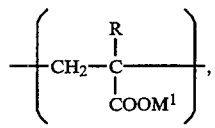
(1)

wherein R and $M^1$ are the same as described above, and (B) repeating units expressed by the formula (2):

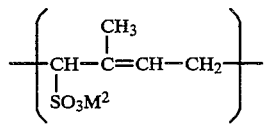
(2)

or (C) repeating units expressed by the formula (3):

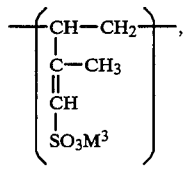
(3)

wherein $M^2$ and $M^3$ are the same as describe above.

$M^1$, $M^2$ and $M^3$ in the formulae (1), (2) and (3) described above are a hydrogen atom or a monovalent cation, respectively. Examples of the monovalent cation are metal ions, such as sodium ion, potassium ion and the like, ammonium ion, alkyl- or alkanol-substituted ammonium ion and the like.

The (meth)acrylic acid unit or the (meth)acrylic acid salt unit in the repeating unit (A) described above has the function to dissolve calcium ion by the chelating reaction with calcium ion in calcium carbonate attached to a heat transfer surface or the like. When the content of the unit is higher, the amount of dissolved calcium is increased but the copolymer shows more tendency to form gel. On the other hand, the isoprene sulfonic acid unit and the isoprene sulfonic acid salt unit in the repeating unit (B) or in the repeating unit (C) has the function of preventing the formation of gel.

In the present invention, the mol ratio of the repeating unit (A) and the repeating unit (B) or the repeating unit (C) in the isoprene sulfonic acid copolymer is in the range of 30:70 to 95:5 and preferably in the range of 80:20 to 95:5. When the content of the repeating unit (A) is less than the range described above, the effect of dissolving calcium ion is not sufficiently exhibited. When the content is more than the range, the copolymer has higher tendency to form gel. It is necessary that the weight average molecular weight of the copolymer calibrated with polystyrene is in the range of 1,000 to 100,000, preferably in the range of 3,000 to 50,000 and more preferably in the range of 5,000 to 30,000. When the weight average molecular weight is out of this range, the object of the present invention is not sufficiently achieved.

The isoprene sulfonic acid copolymer used in the scale removing agent of the present invention can be prepared by copolymerizing (meth)acrylic acid or a salt thereof constituting the repeating unit (A) described above and the isoprene sulfonic acid or a salt thereof constituting the repeating unit (B) or (C) described above by a conventional method. A suitable fraction of the free acid contained in the prepared copolymer may be converted into a salt type group by using an alkali or an amine according to necessity.

In the copolymer, copolymerizable monomers other than the monomers described above may be copolymerized according to desire within the range that the object of the present invention is not adversely effected. Examples of the copolymerizable monomer other than the monomers described above are amides containing vinyl groups, such as acrylamide, methacrylamide, dimethylacrylamide, dimethylmethacrylamide and the like, cyanovinyl compounds, such as acrylonitrile, methacrylonitrile and the like, alkyl esters of (meth)acrylic acid, such as methyl acrylate, ethyl acrylate, methyl methacrylate, ethyl methacrylate and the like, vinyl esters of carboxylic acids, such as vinyl acetate and the like, aromatic vinyl compounds, such as styrene, α-methylstyrene, p-methylstyrene and the like, and the like compounds.

To the scale removing agent of the present invention, scale preventing agents, anticorrosion agents, slime preventing agents, bactericides, chelating agents and other agents which are generally added to water treatment agents can be mixed as well.

Examples of the scale preventing agent are salts of polyacrylic acid, partial hydrolysis products of polyacrylamide, maleic acid polymers, itaconic acid polymers, acrylic copolymers containing hydroxyethyl methacrylate and the like compounds.

Examples of the anticorrosion agent are phosphorus compounds, such as phosphoric acid, polymerized phosphoric acid, phosphoric acid and the like, oxycarboxylic acids, thiazoles, triazoles, amines, hydroxamic acids and the like.

Examples of the slime preventing agent are chlorine gas, calcium hypochlorite, sodium hypochlorite, sodium chloroisocyanurate, hydrazine, quaternary ammonium salt agents and the like.

The scale removing agent of the invention comprising the isoprene sulfonic acid copolymer as the effective component thereof thus prepared can clean and remove scale deposited on the cooling water system while the ordinary operation of the system is maintained.

A preferable example of practicing the method of removing scale of the present invention using the scale removing agent described above is described in the following. The scale removing agent is charged from a pit of the cooling tower or the like into the cooling water system in which scale is formed and deposited in such an amount that the amount of the scale removing agent is generally 0.01 weight % or more, preferably in the range of 0.1 to 10 weight %, more preferably in the range of 0.5 to 8 weight % and most preferably in the range of 0.5 to 5 weight % based on the total amount of water contained in the system while operating the cooling water system, but closing a blowing valve. The scale removing agent may be charged by adding the whole amount at once or by adding it in several separate additions. Water added with the scale removing agent is circulated for several hours to several days to cleave and remove scale. The preferable method by which one can determine the time when the cleaning operation is finished is described later. When the circulating water in the cooling water system for cleaning is in a concentrated condition, it is preferred that the effect of the scale removing agent is further enhanced by diluting as much as possible by continuous forced addition of water or the like method to reduce the concentration of hardness component in the circulated water.

Then, the cooling water is diluted by forced overflow or by further continuation of the ordinary operation by opening the blowing valve. Thus, the whole cleaning process is finished.

The scale removing function of the isoprene sulfonic acid copolymer can be shown by the following equations.

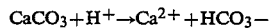

$$CaCO_3 + H^+ \rightarrow Ca^{2+} + HCO_3^-$$

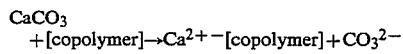

$$CaCO_3 + [copolymer] \rightarrow Ca^{2+} - [copolymer] + CO_3^{2-}$$

wherein $H^+$ is the acid component dissociated from the functional groups made by carboxylic and/or sulfonic acid in the scale removing agent.

The equations show that, in the condition of operation of the cooling water system, calcium carbonate formed on heat transfer surfaces or the like makes contact with the isoprene sulfonic acid copolymer and calcium ion is discharged by the chelating action of the copolymer according to the equations described above. The concentration of calcium ion is increased with progress of the reaction and the amount of the removed calcium carbonate scale can be found by measuring the concentration of calcium ion by using the atomic absorption spectrum method or the like method.

In the preferred method of the present invention, the operation of the cooling water system is not stopped but a blowing valve alone is closed and then the whole of a specified amount of the acidic scale dissolving agent in which $M^1$, $M^2$ and $M^3$ are hydrogen in the formulae (1), (2) and (3) described above is added. The pH value in the circulated water is decreased temporarily by the addition of the scale dissolving agent. However, the pH value is increased again by the increased dissolution of calcium carbonate with the progress of the cleaning operation. Therefore, when the pH value returned to 5 or more, or preferably to an approximately neutral value, it is decided that the cleaning process has been finished and the blowing valve is opened to resume the normal operation of the cooling water system.

The mechanism by which the pH value of the circulated cleaning water is increased with progress of the cleaning after the addition of the acidic scale dissolving agent can be considered as following:

$$CaCO_3 \text{ (solid)} \rightleftarrows Ca^{2+} + CO_3^{2-} \text{ (liquid)} \tag{4}$$

$$CaCO_3\text{(solid)} + H^+ \rightleftarrows Ca^{2+} + HCO_3 \tag{5}$$

$$Ca^{2+} + Y^{m-} \text{(scale dissolving agent) "}CaY^{n-}\text{"} \tag{6}$$

By chelating $Ca^{2+}$ with the scale dissolving agent, $Ca^{2+}$ in water is decreased. As the result, the reaction (4) described above proceeds to the right side and $Ca^{2+}$, $HCO^{3-}$ and $CO_3^{2-}$ in water are increased. In the presence of $Y^{m-}$, $Ca^{2+}$ is present in water as $CaY^{n-}$ and, on the other hand, the concentrations of $HCO_{3-}$ and $CO_3^{2-}$ are increased. Because $HCO_{3-}$ and $CO_3^{2-}$ are alkaline components, the pH value is gradually increased while $Ca^{2+}$ is being progressively dissolved from $CaCO_3$.

The amount of addition of the acidic scale dissolving agent can be selected suitably according to the kind of the agent. For example, when the isoprene sulfonic acid copolymer described above is used as the acidic scale dissolving agent, it is preferred that the whole amount of the agent which is generally 0.01 weight % or more, preferably in the range of 0.1 to 10 weight %, more preferably in the range of 0.5 to 8 weight % and most preferably in the range of 0.5 to 5 weight % based on the total amount of water in the system is added at once.

The pH value at the time when the calcium hardness ceased to increase is obtained in advance by a preliminary experiment and the finishing point of the cleaning process is decided by using this pH value as the criterion for finishing the cleaning operation. The relation between the calcium hardness and the pH value is also measured in advance by the preliminary experiment. The criterion of the pH value at which the descaling process is finished in the present invention is generally 5 or more and preferably in the range of 7.0 to 8.0.

The measurement of the pH value may be made by using a simplified pH meter or by using a pH indicator. Examples of the pH indicator are Methyl Red (MR) (pH, 5.4 to 7.0; color change, red to yellow), Brom Cresol Purple (BCP) (pH, 5.6 to 7.2; color change, yellow to purple), Brom Thymol Blue (BTB) (pH, 6.2 to 7.8; color change, yellow to blue), Phenol Red (PR) (pH, 6.6 to 8.2; color change, yellow to red), a mixture of BTB and MR (pH, 5.0 to 8.0; color change, red to blue) and the like.

Samples of water are taken at the start of the cleaning process and at specified times after the start of the cleaning process. The finishing of the cleaning process is decided by measuring the pH value by a pH meter or by the increase of pH or the change of color on addition of the indicator described above. When the function of the water system is not recovered by one operation of the cleaning process, the method of the present invention described above can be repeated.

To summarize the advantages obtained by the invention, the scale removing agent of cooling water system of the present invention has excellent ability to remove scale, it does not require much man power not causes loss of productivity because the scale can be cleaned and removed without stopping the circulation of cooling water while the ordinary operation of the system is maintained and has no possibility of such danger to operator as found in conventional acid cleaning process because the agent is used at less acidic condition. Furthermore, the copolymer itself has the characteristic that gell is not easily formed.

According to the preferred method of the present invention, the finishing point of the scale removal can be found easily by measuring the pH value on the spot of the operation without stopping the operation of the cooling water system.

The invention will be understood more readily with reference to the following examples; however, these examples are intended to illustrate the invention and are not to be construed to limit the scope of the invention.

EXAMPLE OF TESTING 1

Test Of Dissolution of Calcium Carbonate

Ability of dissolution of scale removing agents to calcium carbonate was evaluated.

Pure water was charged in a beaker and a scale removing agent was added to it to the concentration of 5000 mg/liter. High purity calcium carbonate powder having average particle diameter of 0.5 to 1 μm was added further to it to the concentration of 5000 mg-$CaCO_3$/liter (pH 7). The beaker was then placed in a thermostatted bath kept at 30° C. and the container was stirred for 20 hours by a stirrer. After finishing the test, the test fluid was immediately filtered with a 0.1 μm milipore filter and the concentration of calcium ion (hardness) in the filtrate was measured by the atomic absorption spectrum method. The results are shown in the middle column of Table 1.

EXAMPLE OF TESTING 2

Test of Gel Formation

Into a 500 ml conical beaker, 500 ml of ultrapure water was charged. After addition of a boric salt buffer, a scale removing agent and calcium chloride to it, the pH value was adjusted to 8.5 with an aqueous solution of sodium hydroxide and an aqueous solution of sulfuric acid. The beaker was sealed tightly and left standing in a thermostatted bath kept at 90° C. for 1 hour. Then, the light absorption was measured at the wave length of 380 nm by using a 50 mm cell. The calcium hardness was varied and the point at which the light absorption was increased rapidly was decided as the gelling point. The results are shown in the right column of Table 1.

TABLE 1

| scale removing agent | calcium hardness (mg-CaCO₃/l) | gel point (mg-CaCO₃/l) |
|---|---|---|
| AA/IPS 70/30 | 667 | 2200 |
| AA/IPS 80/20 | 824 | 2000 |
| AA/IPS 90/10 | 1113 | 1800 |
| AA/IPS 95/5 | 1250 | 1600 |
| itaconic acid homopolymer | 875 | 1000 |
| maleic acid homopolymer | 631 | 1200 |
| acrylic acid 100/0 | 800 | 800 |

AA: acrylic acid unit
IPS: isoprene sulfonic acid unit

As shown in Table 1, the dissolved amount of calcium carbonate increased with increase of the content of the acrylic acid unit until the dissolved amount decreased by the formation of gel.

It is also Shown in Table 1 that the itaconic acid homopolymer which has been used in similar methods of cleaning is inferior with respect to both the dissolved amount and the gelling point in comparison with the copolymer of the present invention. This result suggests that the dissolved amount and the gelling point are related not only to the carboxylic group but also to the sulfonic acid group of the isoprene sulfonic acid unit. Although the polyacrylic acid shows a higher amount of dissolution of calcium carbonate, it forms gel more easily and the dissolved amount reaches the maximum at the gelling point.

EXAMPLE 1

Test of Removal of Scale on a Model Heat Exchanger

A test of removal of scale was conducted by using a model heat exchange apparatus. The scale removing agent of the present invention comprising the isoprene sulfonic acid copolymer as the effective component (mol ratio of acrylic acid/isoprene sulfonic acid, 90/10; molecular weight, 20,000) was added to the apparatus in such an amount that the amount of the copolymer was 5,000 mg/liter based on the total water in the system. The whole amount was added at once. The test was conducted under the following operating conditions.

Operating condition:
Heating by hot water (temperature of the hot water at the inlet, 80° C.); flow speed of the hot water: 8 liter/minute
Temperature of cooling water at the inlet: 30° C.; at the outlet: about 37° to 38° C.
Flow speed of cooling water: 5.26 liter/minute
Make up water: city water supplied by Atsugi city
Test period: 40 hours
Material of heat exchanger tube: a copper tube attached with scale The results are shown in Table 2.

TABLE 2

| test time (hour) | calcium hardness (mg-CaCO$_3$/l) | dissolved concentration (mg-CaCO$_3$/l) |
|---|---|---|
| 0 | 113 | — |
| 1 | 1069 | 956 |
| 2 | 1283 | 1170 |
| 5 | 1332 | 1219 |
| 20 | 1588 | 1475 |

As shown in Table 2, calcium hardness in the circulated water was increased as the test period passed. This is considered to be caused by removal of scale deposited on the cooling water system by the scale removing agent and dissolution of the scale as calcium ion in the circulated water.

EXAMPLE 2

As the acidic scale dissolving agent, a copolymer having weight average molecular weight of 20,000 comprising the acrylic acid unit and the isoprene sulfonic acid unit in a mol ratio of 90:10 was used. The material solution containing 40 weight % of the polymer had the pH value of 4.0.

Blow valves of the cooling water systems A and B were closed while the operation of the systems was maintained and the whole material solution was added at once in such an amount that the concentration in the circulating water was 50,000 mg/liter. Samples were taken from the circulating water at the specified times shown in Table 3 and the pH value and the calcium hardness were measured in the laboratory. The pH values and the calcium hardness in the water at the specified times are shown in Table 3.

TABLE 3

| water system | cleaning time (hour) | pH | calcium hardness (mg-CaCO$_3$/l) |
|---|---|---|---|
| A | 0 | 7.7 | 115 |
|   | 1 | 6.9 | 2330 |
|   | 3 | 7.2 | 2483 |
|   | 20 | 7.6 | 2470 |
| B | 0 | 8.8 | 70 |
|   | 0.5 | 5.9 | 980 |
|   | 1 | 6.1 | 1318 |
|   | 3 | 6.8 | 2075 |
|   | 6 | 7.1 | 2981 |
|   | 10 | 7.3 | 2901 |

The color of the cooling water of these A and B systems was light brown and suspended solid was contained. However, the result of separate measurement by a membrane filter method showed that the polymers were not gelled.

As shown in Table 3, the limiting dissolution was attained after about 3 hours in the system A and after about 6 hours in the system B. Thus, it is shown that the finishing point of the cleaning can be decided from these pH values.

Therefore, the specified pH value can be set at 7.2 in the system A and at 7.1 at the system B and the cleaning operation can be stopped when the pH value reached the specified value.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method of removing calcium compound-containing scale including calcium carbonate in a cooling water system in which said scale is formed which comprises adding to the cooling water in the cooling water system, while the system is operating, 0.01 weight % or more based on the total amount of water contained in the cooling water system of a scale dissolving agent which comprises a copolymer containing vinyl monomer units having a carboxy group or salt thereof and vinyl monomer units having an isoprene sulfonic acid group or salt thereof in amounts such that the mol ratio of the carboxyl group to the sulfonic acid group is in the range of 30:70 to 95:5, said copolymer having a weight average molecular weight calibrated with polystyrene sulfonic acid sodium salt of 1,000 to 100,000, thereby producing a cleaved or dissolved scale solution, and, thereafter discharging said cleaved or dissolved scale solution from the cooling water system.

2. The method of removing scale claim 1, wherein the scale dissolving agent comprises as the effective component thereof an isoprene sulfonic acid copolymer containing:

(A) repeating units of the formula (1),

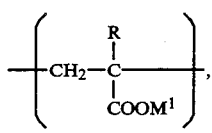

wherein R is a hydrogen atom or methyl group and $M^1$ is a hydrogen atom or a monovalent cation, and (B) repeating units of the formula (2),

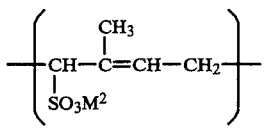

or
(C) repeating units of the formula (3),

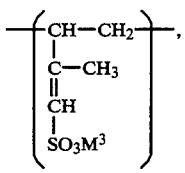

wherein $M^2$ and $M^3$ are independently a hydrogen atom or monovalent cation,

3. The method of removing scale of claim 2, further comprising, after addition of the scale removing agent containing the copolymer to the cooling water system, measuring the pH of the cooling water and discharging the cleaved or dissolved scale solution when the pH of the cooling water reaches a value of 5 or more.

4. A method of removing scale as claimed in claim 3, wherein the cleaved or dissolved scale solution is discharged when the pH of the cooling water is from 7.0 to 8.0.

5. The method of removing scale of claim 1, further comprising, after addition of the scale removing agent containing the copolymer to the cooling water system, measuring the pH of the cooling water and discharging the cleaved or dissolved scale solution when the pH of the cooling water reaches a value of 5 or more.

6. A method of removing scale as claimed in claim 5, wherein the cleaved or dissolved scale solution is discharged when the pH of the cooling water is from 7.0 to 8.0.

7. The method of claim 1, wherein said cleaved or dissolved scale solution is discharged by discharging cooling water from the cooling water system.

8. The method of claim 1, wherein the cooling water containing the cleaved or dissolved scale solution is diluted by the addition of water before discharging it from the cooling water system.

9. The method of claim 1, wherein the scale dissolving agent is used in an amount of 0.1 to 10% by weight based on the total amount of water in the cooling water system.

* * * * *

UNITED STATES PATENT AND TRADEMARK OFFICE
CERTIFICATE OF CORRECTION

PATENT NO. : 5,346,626
DATED : September 13, 1994
INVENTOR(S) : Katsuhiko MOMOZAKI et al.

It is certified that error appears in the above-indentified patent and that said Letters Patent is hereby corrected as shown below:

Claim 2, Column 11, Line 32: Delete "," and insert -- . --

Claim 5, Column 12, Line 11: After claim, delete "1" and insert -- 2 -- .

Signed and Sealed this

Third Day of January, 1995

Attest:

BRUCE LEHMAN

Attesting Officer

Commissioner of Patents and Trademarks